July 23, 1940.　　　　C. E. STOLTZ　　　　2,209,177
SELF-PROPELLED MINING TRUCK
Filed July 18, 1938　　　3 Sheets-Sheet 1
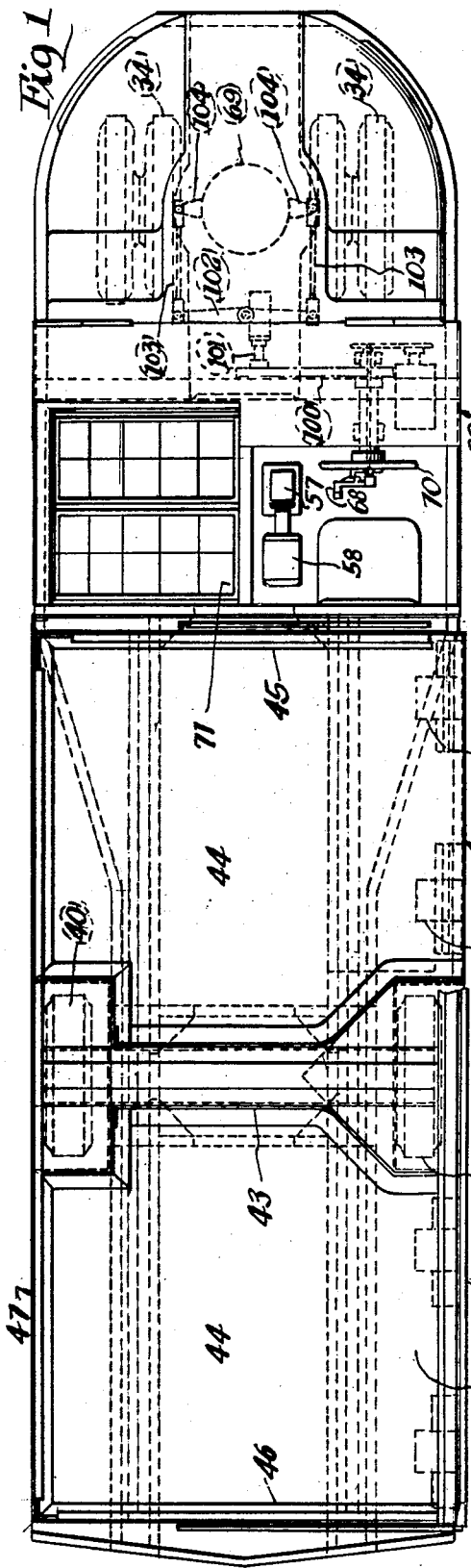
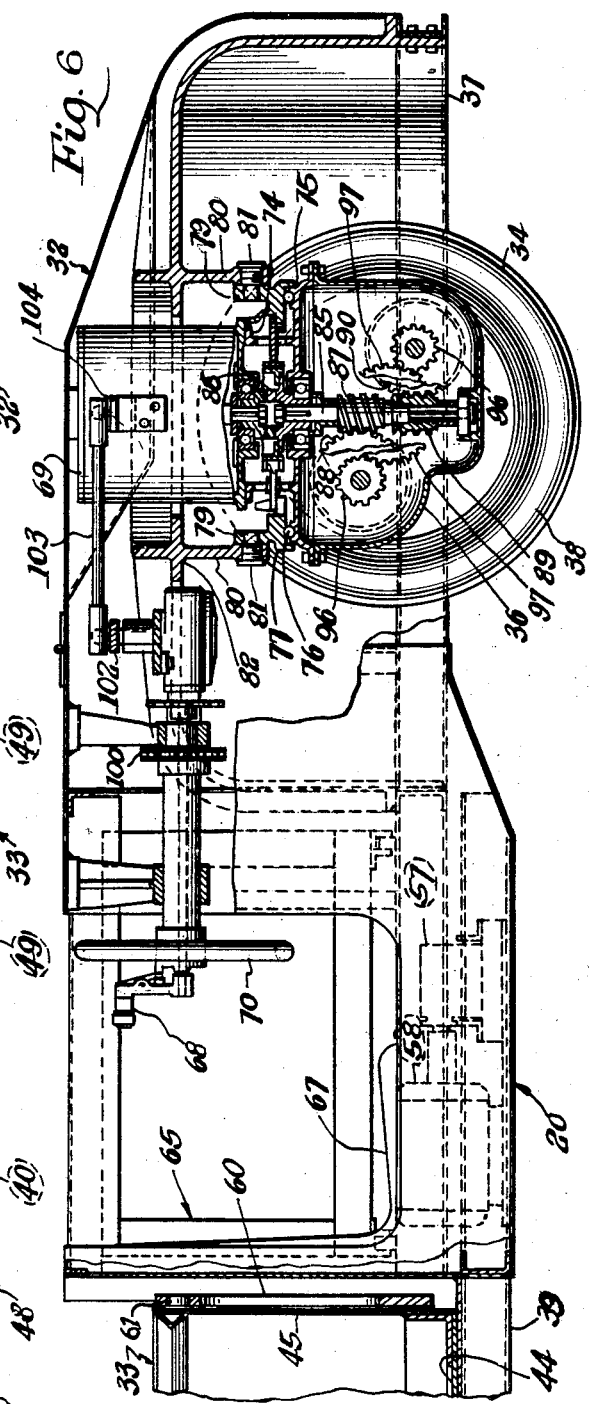
Inventor
Charles E. Stoltz
Clarence F. Poole
Attorney

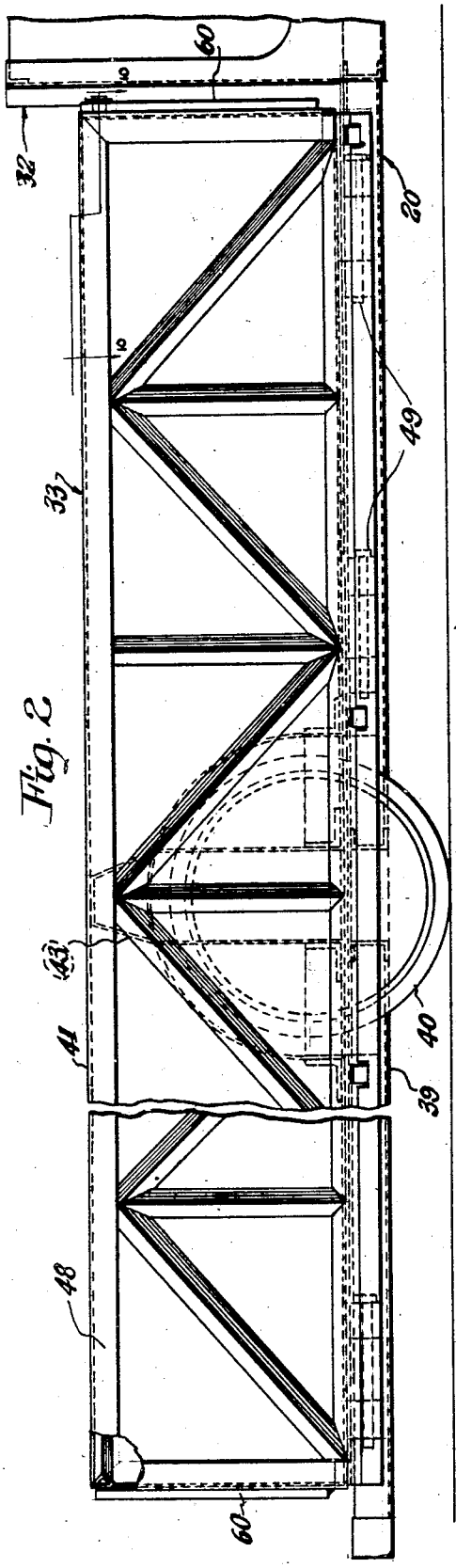
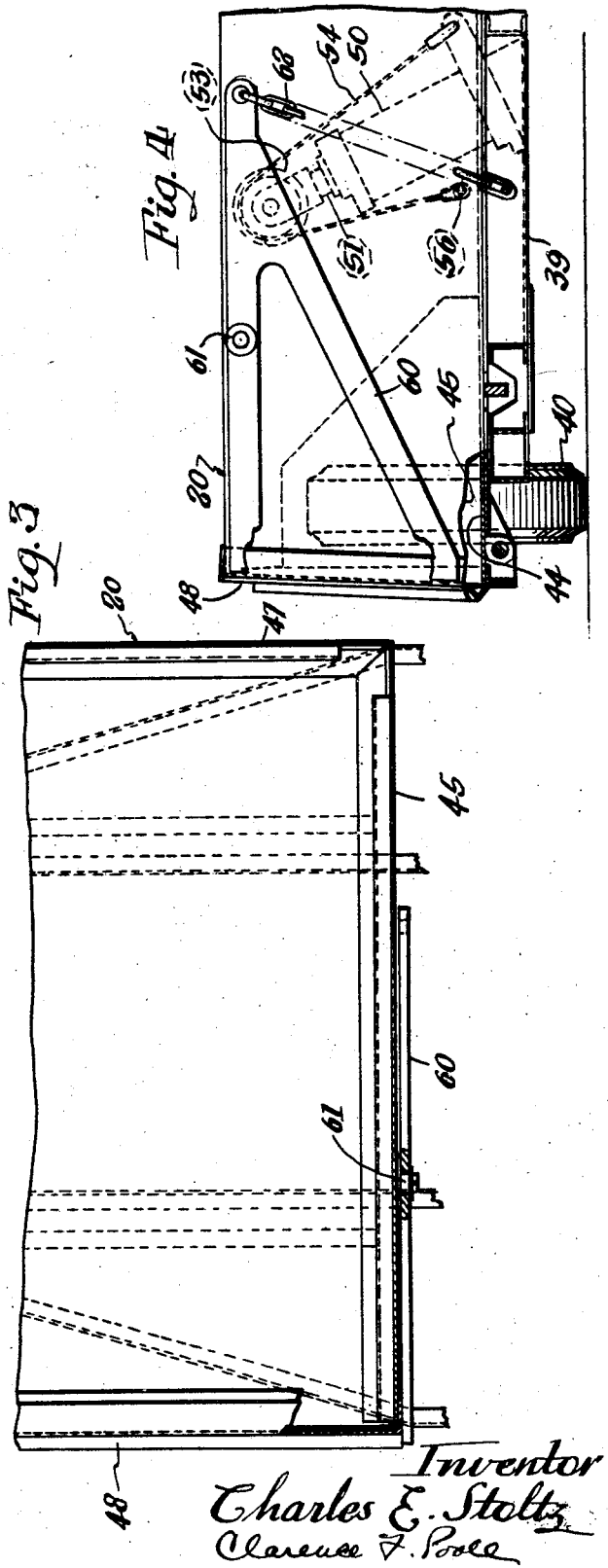

July 23, 1940.  C. E. STOLTZ  2,209,177
SELF-PROPELLED MINING TRUCK
Filed July 18, 1938　　3 Sheets-Sheet 3
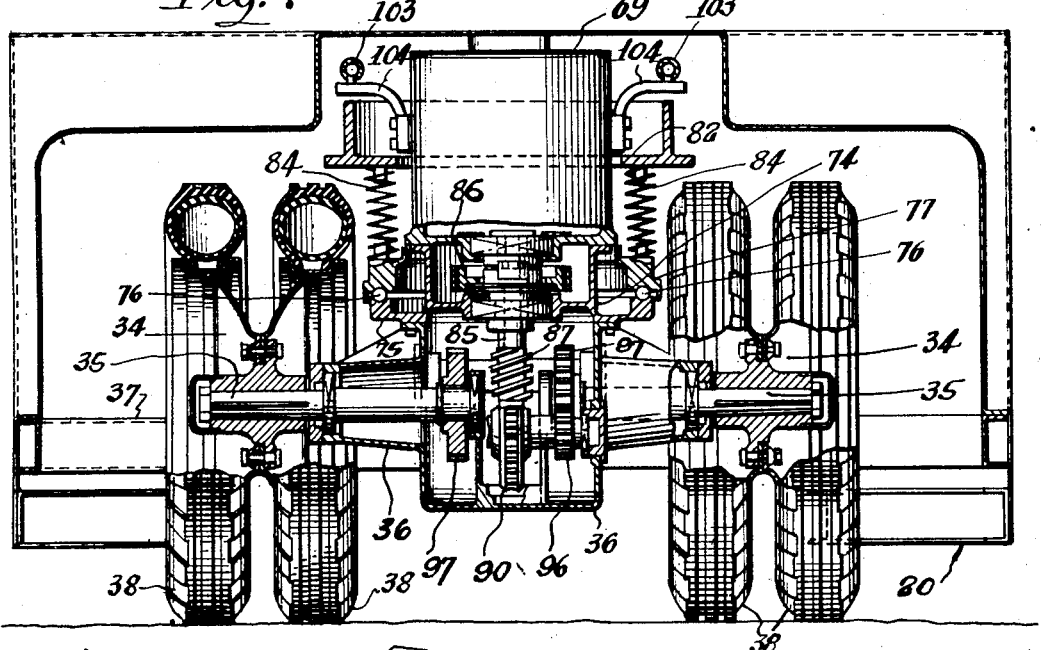
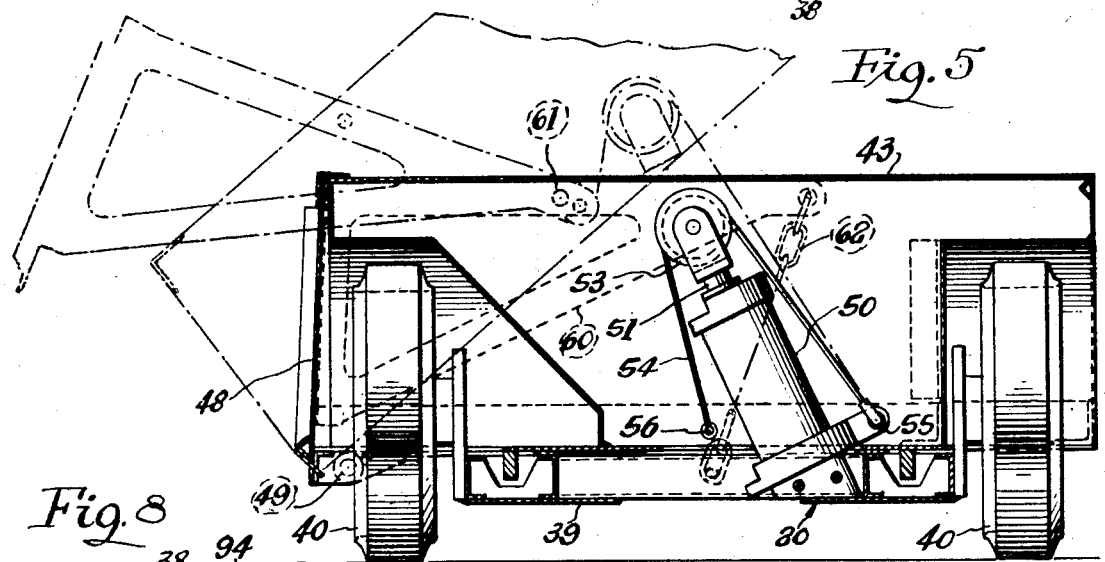
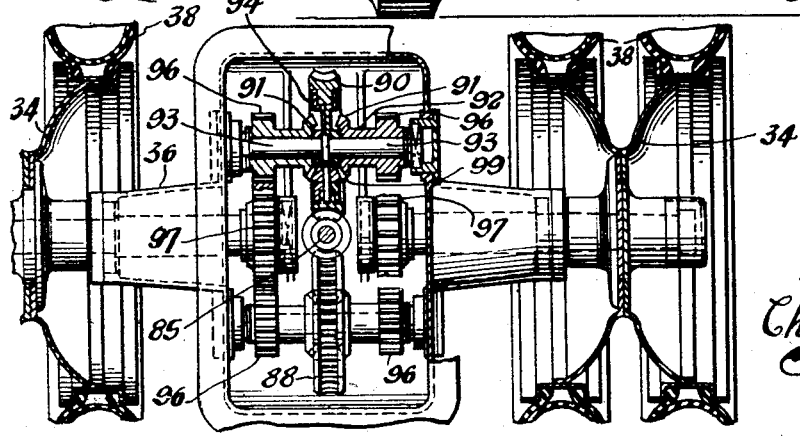
Inventor
Charles E. Stoltz
Clarence F. Poole
Attorney Patented July 23, 1940

2,209,177

UNITED STATES PATENT OFFICE 2,209,177

SELF-PROPELLED MINING TRUCK

Charles E. Stoltz, Chicago, Ill., assignor to Goodman Manufacturing Company, Chicago, Ill., a corporation of Illinois Application July 18, 1938, Serial No. 219,699

6 Claims. (Cl. 180—65)

The principal object of my invention is to provide a new and improved vehicle for use in transporting coal underground which is of a simplified, low, compact construction, having front driving wheels of a relatively large diameter and so arranged that steering is effected by pivotal movement of the wheels about a common vertical axis.

A further object of my invention is to provide a self-unloading vehicle of a more compact form than formerly arranged with a view towards permitting ready maneuverability of the vehicle in confined spaces, by providing a front drive and steering vehicle having a rearwardly disposed material carrying body which may dump to one side thereof by tilting movement thereof, and by arranging a cab containing space for the operator and electric storage batteries behind the traction wheels, and recessing the bottom of this cab beneath the tops of said wheels.

Other objects of my invention will appear from time to time as the accompanying specification proceeds.

My invention may be more clearly understood with reference to the accompanying drawings wherein:

Figure 1 is a plan view of a material transporting vehicle, constructed in accordance with my invention, with certain parts broken away;

Figure 2 is an enlarged view in side elevation of the rear part of the vehicle;

Figure 3 is a fragmentary detail plan view of the rear part of the vehicle, drawn to substantially the same scale as Figure 2, with certain parts in horizontal section in order to illustrate certain details of construction thereof;

Figure 4 is a fragmentary end view of the rear part of the vehicle drawn to a slightly smaller scale than Figure 2, with certain parts in section in order to show certain details of construction thereof not shown in Figures 2 and 3;

Figure 5 is a transverse sectional view taken through the central portion of the rear part of the vehicle, drawn to substantially the same scale as Figure 4 and showing certain details of the housing for the rear idling wheels, and the tilting mechanism for the material carrying body of the vehicle;

Figure 6 is a view in side elevation of the front part of the vehicle illustrated in Figure 1 and drawn to substantially the same scale as Figure 2, with certain parts shown in substantially longitudinal section, in order to illustrate certain details of the drive to the traction wheels;

Figure 7 is an enlarged transverse sectional view taken through the drive for the front traction wheels; and Figure 8 is an enlarged plan view taken through the drive for the front traction wheels, with certain parts shown in horizontal section.

Referring now to the drawings and one form in which my invention may be embodied, a truck 20 is provided which includes a front traction and steering section 32 having a rear material carrying or body section 33, detachably secured thereto in a suitable manner so the capacity of the truck may be increased or decreased by connecting different capacities of material carrying sections to said front traction and steering section.

The front power and steering section 32 includes a pair of spaced traction wheels 34, 34, each of which wheels is herein shown as being keyed to a power driven axle 35 (see Figure 7). Said axles are mounted in a housing 36, which in turn is mounted in a truck frame 37, for pivotal movement about a vertical axis disposed intermediate the inner ends of said axles, to permit steering of the truck by turning said housing and wheels about said vertical axis. Each of the wheels 34, 34 is herein shown as being provided with a pair of spaced pneumatic tires 38, 38 of a relatively large diameter to provide adequate traction for the truck. The drive to said wheels and support therefor, in said frame, will be more clearly described as this specification proceeds.

The rear body section 33 includes a frame 39 detachably connected to the frame 37 in a suitable manner, and mounted on idler wheels 40, 40 intermediate the ends thereof. Said idler wheels are of a relatively large diameter and are herein shown as being provided with solid rubber tires. A material carrying body 41 is recessed beneath said wheels and extends forwardly and rearwardly therefrom. Said body is provided with a central upstanding portion 43 which forms a housing for the upper part of said wheels and which extends across the body thereof dividing it into a forward and rear material carrying section. The body 41 is open at its top and is provided with bottoms 44, 44 for the front and rear sections thereof, front and rear walls 45 and 46 respectively, a fixed side wall 47 extending the length thereof, and an opposite vertically liftable side wall 48, which moves upwardly away from the bottom, as said body is tilted. Material may thus slide along the bottom thereof and discharge onto the receiving conveyer 24. As herein shown, said body is pivotally connected to the frame 39 on hinge members 49, 49, at the side thereof adjacent the vertically liftable wall 48.

The body is tilted about the pivotal axis of the hinge members 49, 49 by means of a cylinder 50. Said cylinder is mounted on the frame 39 adjacent the central portion thereof, between the wheels 40, 40, and extends angularly upwardly into and is enclosed by the raised central portion 43 of said body. A piston 51, having a sheave 53 mounted on the outer end thereof, is mounted in said cylinder. A flexible cable 54 is trained over said sheave. Said cable is secured at one of its ends to a bracket 55 extending angularly upwardly from the bottom of said cylinder and is fixed at its opposite end to the body 41 by means of a pin 56. Thus when fluid under pressure enters said cylinder, the cable 54 will tilt said body for dumping.

Fluid under pressure may be supplied to said cylinder in a usual manner, through suitable pipes (not shown) and a pump generally indicated by reference character 57, which is herein shown as being driven by an electric motor 58 (see Figure 1).

The liftable side 48 is provided with arms 60, 60 extending inwardly from opposite ends thereof. Said arms are pivotally connected with the front and rear walls 45 and 46 respectively, at points spaced inwardly from the outer ends thereof on pivotal pins 61, 61. The ends of said arms project inwardly from said pivotal pins and are connected with the frame 39 by means of a flexible member 62, herein shown as being a chain. It may thus be seen that upon tilting movement of the body 41, the side 48 will be pivotally moved in an upward direction about the pins 61 which will lift said side away from said body portion and permit the coal to slide along the bottoms 44, 44 and be discharged from the side thereof.

Referring now in particular to the details of the front traction section, said section is provided with a cab 65, disposed to the rear of the track wheels 34, 34, which is recessed beneath said wheels to permit the use of relatively large track wheels without increasing the height of the machine. Said cab is arranged to provide space for the operator and for storage batteries for supplying power to the truck, and is provided with an operator's seat 67 at one side thereof. A control lever 68 is provided in said cab for controlling operation of a motor 69, which has driving connection with the traction wheels 34. A steering wheel 70 is also provided in said cab for controlling pivotal movement of the housing 36 and steering the truck. A battery containing compartment 71, adapted to carry suitable storage batteries, is provided at the opposite side of said cab (see Figure 1). Suitable electrical conduits (not shown) are connected between said batteries and motor for supplying electric current to said motor.

The power drive from the motor 69 to the traction wheels 34, 34 is somewhat similar to that shown in a Patent No. 1,079,607 which issued to Harry H. Schieler on Nov. 25, 1913, so will only be described in so far as is necessary to make my present invention clearly understandable. The motor 69, as herein shown, is so arranged that its armature shaft is vertically disposed. Said motor is mounted on its lower end plate on a frame member 74 which forms a top cover for the housing 36. Said frame member is provided with a widely extended annular lower portion 75 which is provided with an annular race on the upper side thereof, having suitable balls 76, 76 mounted therein. Said balls are adapted to engage the underside of an annular frame 77 and thus form a ball bearing supporting connection between said annular frame and the housing 36.

The annular frame 77 is provided with a pair of opposite, upwardly extending ears 79, 79 which are trunnioned on depending brackets 80, 80 by means of pivotal pins 81, 81 (see Figure 6). The brackets 80, 80 depend from an annular portion 82 of the truck frame 37, through which the motor 69 extends. Suitable coil springs 84, 84 are interposed between the underside of the annular portion 82 of the truck frame 37 and the upper side of the annular frame 77, to permit yieldable movement of the housing 36 about an axis extending longitudinally of the truck.

The motor 69 has driving connection with an aligned coaxial shaft 85, extending downwardly therefrom, by means of a flexible coupling 86. A worm 87 is mounted on said shaft and meshes with and drives a worm ring gear 88. A worm 89 is likewise mounted on said shaft, beneath said first mentioned worm, and meshes with and drives a worm ring gear 90. Each worm ring gear 88 and 90 is mounted on a spider 94, which in turn is secured to the inner ends of transverse shafts 93, 93, which shafts are journaled at their outer ends in the housing 36. A bevel pinion 99 is mounted in the spider 94 and meshes with oppositely disposed bevel gears 91, 91 (see Figure 8). Said bevel gears are herein shown as being formed integral with sleeves 92, 92 which are freely mounted on the shafts 93, 93. Each sleeve 92 is herein shown as having a spur pinion 96 formed integral therewith. Said pinion meshes with a spur gear 97 keyed to the inner end of the axle 35 for driving said axle. Four spur pinions 96 are thus provided, two of which mesh with a spur gear 97. It may thus be seen that said spur gears, driven from opposite spur pinions, together with the bevel gears 91, 91 and bevel pinions 99, 99 form a differential drive, for said track wheels.

Steering of said motor is effected by the steering wheel 70 through a chain and sprocket drive 100. Said chain and sprocket drive pivotally moves a longitudinally extending shaft 101. Said shaft has driving connection with a steering yoke 102 through a suitable geared reduction drive, such as a worm and worm gear drive (not shown). Said steering yoke is pivotally mounted in the frame 37 and has a pair of steering rods 103, 103 pivotally mounted on opposite ends thereof. Said steering rods are pivotally connected at their forward ends to brackets 104, 104 extending outwardly and upwardly from opposite sides of the motor 69, from a point disposed beneath the upper end thereof, so the truck may be steered by turning movement of said motor, effected by the steering yoke 102.

It will be seen from the foregoing that a novel form of self-propelled vehicle has been provided which includes a front power and steering section and a rear material carrying section, so arranged as to discharge its load from the side thereof, which vehicle is readily maneuverable about the mine, being capable of turning short radius curves and rendering it unnecessary to widen the entries or breakthroughs through which it moves, beyond the standard widths, and also rendering it unnecessary to take up bottom to permit the truck to discharge its load.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim as my invention:

1. In an electric self-propelled material transporting vehicle for mines, a front power and steering section including an electric motor, a pair of traction wheels mounted for pivotal movement about a vertical axis disposed intermediate said wheels, and means for controlling pivotal movement of said wheels about said vertical axis and steering the vehicle, a cab behind said wheels and recessed beneath the turning axis of said wheels and including a compartment for the operator on one side thereof and a compartment for storage batteries, for supplying electric current to said motor, on the opposite side thereof.

2. In an electric truck for transporting material in mines, a frame, a pair of power driven traction wheels at the forward end of said frame, a pair of coaxial axles on which said wheels are mounted, a motor for differentially driving said axles and wheels, said motor having a vertical motor shaft, said axles being mounted for pivotal movement about a vertical axis disposed between the inner ends thereof to permit steering of the vehicle, said motor being mounted with its motor shaft coaxial with the axis of vertical pivotal movement of said axles, a recessed cab disposed behind said wheels, said cab having a bottom disposed beneath the axis of rotation of said wheels and being provided with space for the operator at one side thereof and space for storage batteries for supplying electric current to said motor at the opposite side thereof.

3. In an electric self-propelled material transporting vehicle for mines, a frame, a pair of coaxial axles adjacent the forward end of said frame having supporting traction wheels mounted thereon, an electric motor having a vertical motor shaft, for differentially driving said axles and wheels, said axles being mounted for pivotal movement about a vertical axis disposed between the inner ends thereof, to permit steering of the vehicle, and a recessed cab disposed behind said wheels, said cab having a bottom disposed beneath the axis of rotation of said wheels and being provided with space for the operator at one side thereof and space for storage batteries, for supplying electric current to said motor, at the opposite side thereof.

4. In an electric self-propelled material transporting vehicle for mines, supporting wheels therefor including a pair of rear idler wheels and a pair of front steering and traction wheels mounted for pivotal movement about a common vertical axis, means for steering said wheels by pivoting them about said vertical axis, a material carrying side dumping body disposed rearwardly of said steering wheels having a bottom recessed beneath the axes of rotation of said wheels and being movable for dumping about an axis disposed beneath the axes of rotation of said wheels, and a cab disposed forwardly of said body and behind said front wheels and recessed beneath the turning axis thereof and including a compartment for the operator on one side thereof and a compartment for storage batteries for supplying electric current to said motor on the opposite side thereof.

5. In an electric self-propelled material transporting vehicle for mines, supporting wheels therefor including a pair of rear idler wheels and a pair of front steering and traction wheels mounted on coaxial axles, pivotally movable about a common vertical axis for steering the vehicle, an electric motor for differentially driving said front wheels and axles, a material carrying body disposed rearwardly of said steering wheels and having a bottom disposed beneath the axes of rotation of said rear wheels, and having said wheels recessed within the sides and bottom thereof, and a cab disposed forwardly of said body and rearwardly of said motor and having a compartment for the operator on one side thereof and a compartment for storage batteries for supplying electric current to said motor on the opposite side thereof.

6. In an electric self-propelled material transporting vehicle for mines, supporting wheels therefor including a pair of rear idler wheels and a pair of front steering and traction wheels mounted on coaxial axles, pivotally movable about a common vertical axis, a motor for differentially driving said steering wheels, a material carrying side dumping body disposed rearwardly of said steering wheels and having a bottom recessed beneath the axes of rotation of said rear and steering wheels, and having said rear wheels recessed within the side thereof, said material carrying body being pivotally movable for dumping about an axis disposed beneath the axes of rotation of said wheels, and a cab disposed forwardly of said body and rearwardly of said motor and having a compartment for the operator on one side thereof and a compartment for storage batteries for supplying electric current to said motor on the opposite side thereof, the bottom of said cab being disposed beneath the axes of rotation of said wheels.

CHARLES E. STOLTZ.